US006007735A

United States Patent [19]

Creed

[11] Patent Number: 6,007,735

[45] Date of Patent: *Dec. 28, 1999

[54] COATED BLEACH TABLET AND METHOD

[75] Inventor: Michael J. Creed, Rosemount, Minn.

[73] Assignee: Ecolab Inc., St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/845,964

[22] Filed: Apr. 30, 1997

[51] Int. Cl.[6] .............................. C01B 7/01; C01B 11/06

[52] U.S. Cl. .............................. 252/186.25; 252/186.34; 252/186.35; 427/213.31; 428/402.24

[58] Field of Search ......................... 252/186.34, 186.35, 252/186.25; 427/213.31; 428/402.24

[56] References Cited

U.S. PATENT DOCUMENTS

| | | | |
|---|---|---|---|
| 3,240,712 | 3/1966 | Schulerud et al. | 510/298 |
| 3,703,470 | 11/1972 | Brennan | 510/231 |
| 3,908,045 | 9/1975 | Alterman et al. | 427/213 |
| 3,983,254 | 9/1976 | Alterman et al. | 428/403 |
| 3,990,272 | 11/1976 | Gakhar | 68/207 |
| 4,134,850 | 1/1979 | McCrudden et al. | 252/186.26 |
| 4,136,052 | 1/1979 | Mazzola | 510/302 |
| 4,219,435 | 8/1980 | Biard et al. | 510/439 |
| 4,338,210 | 7/1982 | Clements et al. | 510/305 |
| 4,421,664 | 12/1983 | Anderson et al. | 510/374 |
| 4,460,490 | 7/1984 | Barford et al. | 510/192 |
| 4,532,063 | 7/1985 | Gueldenzopf | 252/186.35 |
| 4,539,179 | 9/1985 | Meloy | 422/28 |
| 4,569,780 | 2/1986 | Fernholz et al. | 510/225 |
| 4,569,781 | 2/1986 | Fernholz et al. | 510/225 |
| 4,680,134 | 7/1987 | Heile et al. | 252/186.26 |
| 4,681,914 | 7/1987 | Olson et al. | 510/381 |
| 4,687,121 | 8/1987 | Copeland | 222/64 |
| 4,690,720 | 9/1987 | Mack | 156/248 |
| 4,690,770 | 9/1987 | Jeschke et al. | 510/224 |
| 4,728,453 | 3/1988 | Choy | 252/186.34 |
| 4,731,195 | 3/1988 | Olson | 252/186.25 |
| 4,741,858 | 5/1988 | Choy et al. | 252/186.36 |
| 4,759,956 | 7/1988 | Amer et al. | 427/213 |
| 4,830,773 | 5/1989 | Olson | 222/209 |
| 4,836,229 | 6/1989 | Lakhan et al. | 134/93 |
| 4,933,102 | 6/1990 | Olson | 252/186.35 |
| 4,938,240 | 7/1990 | Lakhan et al. | 134/101 |
| 4,965,012 | 10/1990 | Olson | 252/186.25 |
| 5,133,892 | 7/1992 | Chun et al. | 510/224 |
| 5,194,230 | 3/1993 | PeKarna et al. | 422/263 |
| 5,213,705 | 5/1993 | Olson | 252/186.35 |
| 5,407,598 | 4/1995 | Olson et al. | 252/186.35 |

FOREIGN PATENT DOCUMENTS

| | | | |
|---|---|---|---|
| 2 221 220 | 1/1990 | United Kingdom . | |

*Primary Examiner*—Joseph D. Anthony
*Attorney, Agent, or Firm*—Merchant & Gould P.C.

[57] ABSTRACT

This invention is directed to a method of dispensing an aqueous bleach solution created by dissolving a continuously advancing substantially coated bleach tablet in a stack of such coated tablets. The invention uses a coated solid active bleach tablet which provides reduced swelling upon contact with water as well a s reduced odor and dusting. Active bleach sources suitable for a coated bleach tablet of the invention include active halogen and oxygen bleaches. Suitable coatings include water soluble organic and inorganic materials. The coated bleach tablets are particularly beneficial for continuous advancement in known solid dispenser systems.

8 Claims, 1 Drawing Sheet

COATED BLEACH TABLET AND METHOD

FIELD OF THE INVENTION

The invention relates to a coated solid source of an active bleach that can be used in bleaching or cleaning processes. The coated solid bleach source is suited for continuous advancement through a dispenser apparatus when contacted with a dissolving/dispensing water spray.

BACKGROUND OF THE INVENTION

The use of dispensers to dispense a solid product by use of water or diluents are known in the art. Such dispensers may be used for many purposes, one of which is to provide active bleach for washing operations. Active bleach is a common component of many washing or sanitizing processes including, washing of kitchenware, tableware, flatware, cookware, etc., laundry, healthcare appliances, food manufacturing equipment, pharmaceutical manufacturing equipment, etc.

A variety of active bleaching compositions are known including oxidant compounds such as halogen and peroxy bleaches. Active halogen compositions have been used for many years in a variety of cleaning or sanitizing methods. Such halogen sources can come in the form of gases (gaseous $Cl_2$, $Br_2$. etc.), liquids (aqueous sodium hypochloride), or solids, calcium hypochloride, chlorinated sodium tripolyphosphate, chlorinated isocyanuric acid and others. Solids can be dissolved in water to create a bleach concentrate.

Solid sources of halogen bleaches have been used in both aqueous solutions, particulate powders or in solid tablet or brick form. The solid tablet or brick form of the solid active bleach source can be used in aqueous dispensers. The dispensers can be calibrated to provide various bleach concentrations, often to provide 1 to 28 grams of halogen or 8 to 125 gm of a peroxy bleach, per bleach cycle.

Generally, the solid tablet or brick is loaded into an aqueous dispenser and advanced within a tablet reservoir to sit directly on a reservoir screen at a predetermined distance from an aqueous spray. As the aqueous spray contacts the surface of solid bleach material the water dissolves a portion of the bleach source creating a liquid bleach concentrate which is directed to a wash bleach cycle. The fixed distance between the spray nozzle and tablet is important in regulating the concentration of bleach released from the tablet.

Solid tablets or bricks of bleach can, however, pose a problem in dispensing. For example, the water spray used to dissolve the bleach tablet can be absorbed by the tablet and can soak through the entire tablet or brick causing the tablet to swell. Such water-soaked tablets can be difficult to dispense due to swelling which causes the sides of the tablet to expand against the walls of the reservoir. As the water erodes the bottom surface of the tablet, the tablet will not advance within the reservoir. Hence, the constant distance between the aqueous spray nozzle and product is lost which can cause significant variation in the concentration of the bleach liquor entering the washing site.

Some solid bleach sources also tend to flake or dust. Contact with the odor or dust of the solid bleach tablets can be annoying or even irritating to some individuals.

The encapsulation of active sources of halogen bleach with organic and inorganic coatings have been disclosed in, for example, Choy et al., U.S. Pat. No. 4,741,858; Olson, U.S. Pat. No. 4,279,764; Brubaker, U.S. Pat. No. 4,279,764; Brennen, U.S. Pat. No. 3,637,509; Idudson, U.S. Pat. No. 3,650,961; Alterman, U.S. Pat. Nos. 3,983,254 and 3,908,045. However, coating of a bleach tablet to facilitate advancement of the tablet in a dispenser apparatus or to reduce odor or dust has not been disclosed.

Accordingly, there exists a need for processes using solid bleach sources to provide a solid bleach source that can dispense a uniform proportion of the solid mass of the source without effecting the distance between the spray nozzle and product. There also exists a need to reduce the odor and dusting of solid bleach tablets.

SUMMARY OF THE INVENTION

DETAILED DESCRIPTION OF THE INVENTION

Figure 1:
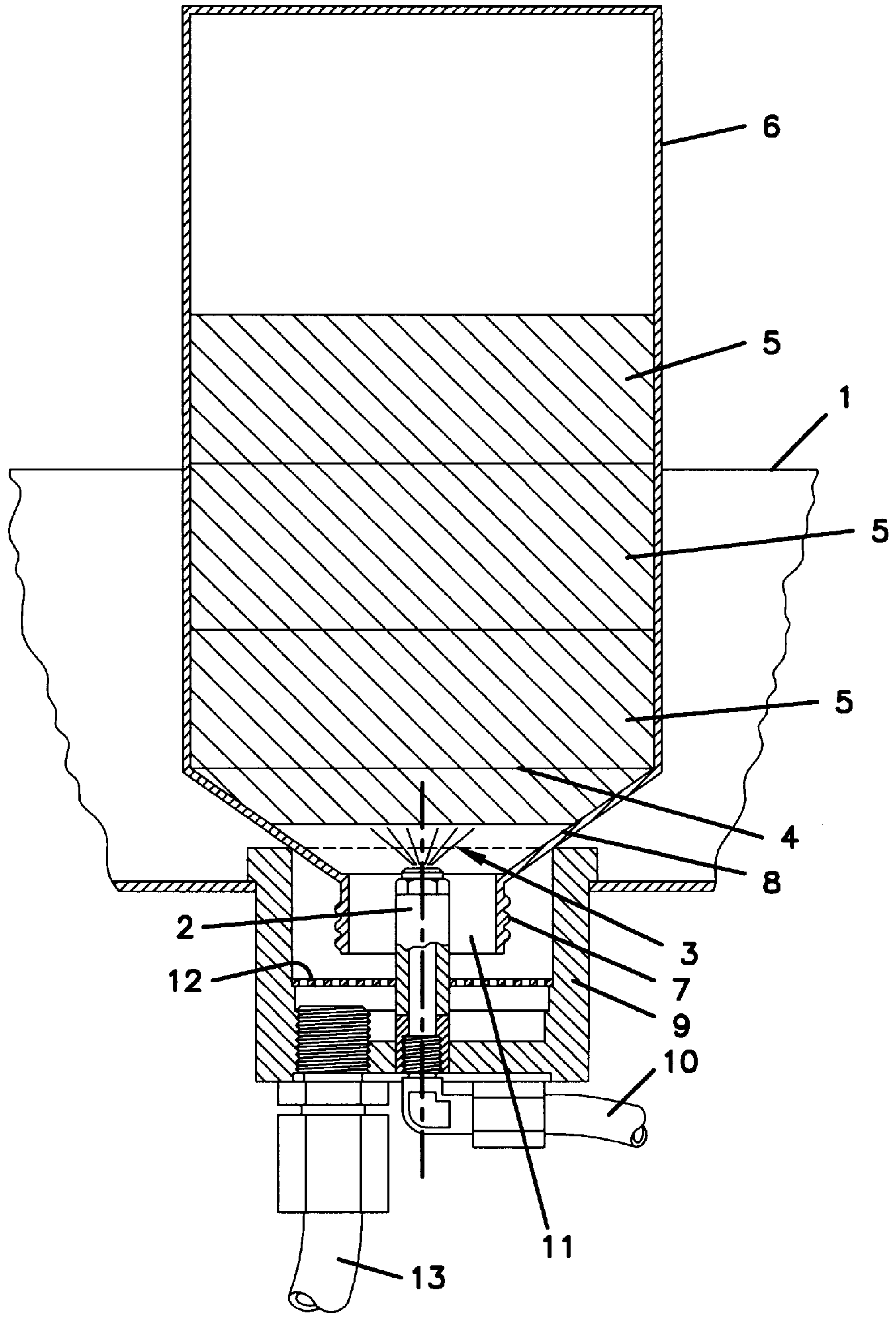
FIG. 1 is an illustration of a water spray type dispenser apparatus enclosing a tablet reservoir loaded with three coated solid bleach tablets of the invention.

The present invention provides a coated bleach tablet which provides reduced swelling of the tablet when contacted by dissolving/dispensing water spray. The coated tablet according to the invention can be used with any suitable solid product dispenser. Examples of suitable dispensers are disclosed, for example, in copending U.S. patent application Ser. No. 08/644,620 or U.S. Pat. No. 5,407,598, the disclosures of which are incorporated herein by reference.

As used herein, the term "brick," "tablet" or "block" connotes a mass of material greater than about 1 gram having a size and shape adapted for introduction into a dispenser to be contacted with a dissolving/dispensing water spray. The water spray, dissolving a controlled portion of the tablet, forms an aqueous bleach concentrate that can be directed to a use locus such as washing machine.

The bricks, tablets or blocks of the invention can include a source of active oxidant bleach such as active halogen or active oxygen in a water soluble outer coating. One or more layers can be used to coat a solid bleach tablet to form a coated bleach tablet of the invention. The water soluble coating can be organic or inorganic. Preferably, the coating is substantially solid at temperatures likely to be encountered during storage of the tablets (about 40° to 120° F.).

A coated bleach tablet of the invention can also reduce the odor or dusting of the bleach source of the tablet.

OXIDANT BLEACH

An oxidant bleach suitable for a coated bleach tablet of the invention includes halogen and peroxy bleaches. A halogen bleach includes a source of active halogen which can comprise a halogen releasing substance suitable to liberate active halogen species such as free elemental halogen (Cl, Br, $Cl_2$, $Br_2$) or $OCl^-$ or -$OBr^-$, under conditions normally used in detergent bleaching cleaning processes of a variety of cleaning targets. Preferably the halogen releasing compound releases chlorine or bromine species. The most preferred halogen species is chlorine. Chlorine releasing compounds include potassium dischloroisocyanurate, sodium dichloroisocyanurate, chlorinated trisodium phosphate, calcium hypochlorite, lithium hypochlorite, monochloramine, dichloramine, [(monotrichloro)-tetra (monopotassium dichloro)] pentaisocyanurate, 1,3 dichloro-5,5-dimethylidantonone, paratoluene sulfodichloroamide, thrichloromelamine, N-chloramine, N-chlorosuccinimide, N,N'-dichloroazodicarbonamide, N-chloroacetyl-urea, N,N-dichloroazodicarbonamide, N-chloroacetyl-urea, N,N-dichlorbiurile, chlorinated dicyandiamide, trichlorocyanuric acid, dichloroglycourea, etc. Chlorinated isocyanurate materials including dichloroisocyanurate dihydrate, sodium dichloroisocyanurate, potassium dichloroisocyanurate, etc. are preferred chlorine sources. Chlorinated isocyanurates are commercially available from Monsanto or Olin and other vendors.

Peroxy bleach compounds are also suitable for a coated bleach tablet of the invention. Peroxy bleach compounds are represented by inorganic and organic ingredients. Any solid form of peroxy bleach compounds can be satisfactory for use in the present invention.

Inorganic peroxy bleach compounds include the alkaline metal salts of perborates, percarbonates persilicates, persulfates, and perphosphates.

Organic peroxy bleach compounds may be used as well. Specific examples of the organic peroxy-bleach compounds are the $C_{1-24}$ aliphatic and aromatic mono- and diperoxy acids such as peracetic acid, percaproic acid, peroleic acid, pertetracosenoic acid, peroxalic acid, peradipic acid, perdodeacedoic acid, pertetrapenedioic acid, perazelaic acid, monoperoxyphthalic acid, diperoxy-terephtalic acid, 4-chlorodiperoxyphthalic acid. Preferred aromatic peracids include the water-soluble salts of diperisophthalic acid, m-chloroperbenzole acid and p-nitroperbenzoic acid and their water soluble salts.

The peroxy-bleach compound can further include an activator. Specific examples of preferred activators include acylated glycolurlles, tetra-acetyl methylene diamine, tetra-acetyl ethylene diamine, triacetyl isocyanurate and benzoylimidazole. Acid anhydride activators which bear at least one double bond between carbon atoms, in alpha,alpha' to the carbonyl group of the anhydride radical can be used as well. Examples thereof are phthalic and maleic anhydrides. Especially preferred bleach activators are based on aldehydes, ketones, and bisulfite adducts of aldehydes and ketones. Examples of these especially preferred activators include 1,4-cyclohexanedione; cyclohexanone; 3-oxo-cyclohexylacetic acid; 4-tertbutylcyclohexanone, 5-diethylmethylammonio-2-pentanone nitrate; N-methyl-morpholinloacetophenone nitrate; acetone, methyl ethyl ketone; 3-pentanone; methylpyrurate; N-methyl-4-oxopiperodine oxide; 1,4-bis(N-methyl-4-oxo-piperidinelomethyl)benzene chloride; N-methyltropinonium nitrate; 1-methyl-4-oxo-piperidinium nitrate; N-benzyl-N-methyl-4-oxopiperidinium nitrate; N,N-dimethyl-4-oxo-piperidinium nitrate; di-2-pyridyl ketone; and chloral hydrate.

SOLID BLEACH TABLET MANUFACTURING PROCESS

The shaped solid bleach source of the invention can be made using a variety of known shaping technologies. The shaped solids can be made by compression processes, the use of molten binding agents, and others known to those skilled in the art. When two or more sources of active bleach are used, the process for manufacturing the shaped solids of the invention generally comprises two steps. First, the bleach powders used in the shaped solids are introduced into a mixing apparatus to form a homogenous powdered blend. Commonly available mixing apparatus such as ribbon blenders can be used. The powder blend is then placed in a commonly available press which can compress the powders into a shaped tablet, brick or block. Generally, the preblended powdered bleach source is placed in a hopper with feeder systems and metered into a tabletizer. The tablet size can vary from about 1 gram to 100 grams and greater. Preferably, the tablet comprises from 500–2,000 grams and can take any convenient shape. One shape readily made by most compression tabletizers is a disc or cylinder. The cylinder diameter can range from approximately ¼ inch to 5 inches or greater having a thickness of about ¼ inch to about 5 inches, preferably about 0.5 inch to 3 inches.

The solid bleach tablet can also be rectangular shaped. The length and width of a rectangular shaped tablet can range from approximately ¼ inch to 6 inches or greater and have a thickness of about ¼ inch to about 5 inches. Generally, as used herein, a "side" of the bleach tablet refers to the thickness dimension. The "top" and "bottom" surface of the tablet refers to the opposing circular or rectangular surfaces. Typically, the top and bottom surfaces are identical but the terms are used to connote the orientation of the solid tablet when loaded into the tablet reservoir of a dispenser apparatus.

A solid bleach tablet suitable for coating according to the invention includes tablets disclosed in Olson et al., U.S. Pat. No. 5,407,598, the disclosure of which is incorporated herein by reference.

Water Soluble Coatings

A coated solid bleach tablet according to the invention is prepared by coating a solid shaped bleach source as described above with a water soluble coating. A suitable water soluble coating can be organic or inorganic.

Organic Water Soluble Coatings

An organic water soluble material suitable for coating a solid bleach tablet of the invention can include emulsion polymers such as polyvinylchloride, polyurethane polymers, acrylic materials, ethylene/vinyl-chloride copolymers, vinylidenechloride/alkylmethacrylate copolymers, vinylchloride/vinylacetate copolymers, neoprene brand (isoprene or chloroprene) polymers, vinylacetate/alkylacrylate copolymers or any known combination thereof. Other suitable polymeric materials include water-soluble cellulose ether compounds selected from the group including ($C_{1-4}$) alkyl cellulose, carboxy ($C_{1-4}$) alkyl cellulose, hydroxy ($C_{1-4}$) alkyl cellulose, carboxy ($C_{1-4}$) alkyl hydroxy ($C_{1-4}$) alkyl cellulose, ($C_{1-4}$) alkyl hydroxy ($C_{1-4}$) alkyl cellulose, and mixtures thereof. In one embodiment, the cellulose ether compound is carboxy methyl cellulose.

Inorganic Coatings Water Soluble Coatings

The inorganic materials suitable for coating a solid bleach tablet of the invention include alkali such as sodium bicarbonate, sodium sesquicarbonate, sodium botate, potassium bicarbonate, potassium sesquicarbonate, potassium borate, phosphates such as diammonium phosphate, monocalcium phosphate, monohydrate, tricalcium phosphate, calcium pyrophosphate, iron pyrophosphate, magnesium phosphate, monopotassium orthophosphate, potassium pyrophosphate, disodium orthophosphate dihydrate, trisodium orthophosphate decahydrate, tetrasodium pyrophosphate, sodium tripolyphosphate, a sodium polyphosphate compound, sodium hexametaphosphate, potassium tripolyphosphate, a potassium polyphospate compound, neutral or soluble salts such as sodium sulfate, sodium chloride sillicates, inorganic sequestering agents and antiredeposition agents and hydrates thereof.

A suitable inorganic coating material also includes, for example, inorganic clays, such as VanGel B, VanGel O, Laponite RDS, available from Southern Clay Products.

Solid Bleach Tablet Coating Procedure

Suitable methods for applying a coating to the solid bleach tablet includes dipping in, spraying on or painting an aqueous solution of the water soluble coating material. The coating can be applied only to the sides of the tablet which will be in contact with the tablet reservoir walls when tablets are in the dispenser apparatus. Alternatively, tablets can be coated on the sides and the surface of the tablet away from the spray nozzle or, the tables can be completely coated.

Once the regions of a tablet are covered with an initial coating, subsequent coatings can be applied using similar methods.

DISPENSER APPARATUS

Generally, a dispenser apparatus of the invention includes a tablet reservoir for receiving one or more bleach tablets, a spray nozzle for providing an aqueous spray to dissolve a portion of the tablet to create a bleach concentrate and a perforated member between the tablet and the spray nozzle. Generally, the tablet reservoir includes a first end, which is proximate to the perforate member, and walls which surround the tablets when loaded. The tablet reservoir can also include a second end, away from the perforate member, through which the tablets can be loaded into the reservoir. For orientation purposes, a tablet is typically loaded into the tablet reservoir with the top surface of the tablet facing the second end of the reservoir and the bottom surface facing the first end of the reservoir. When the aqueous spray contacts the tablet it erodes the bottom surface of the tablet causing the tablet to advance within the tablet reservoir towards the spray nozzle.

As used herein, a "perforated member" refers to a material having openings which permit passage of the aqueous spray to contact the bottom surface of the tablet, but does not permit the tablet, or large chunks which might break from the tablet, to pass through the perforated member. Perforated members include screens and meshes which are known in the art. In some dispenser apparatuses, the solid tablet can directly contact or rest on the perforated member during aqueous spraying from the nozzle. In other dispenser apparatuses, the tablet is retained at a position removed and above the perforated member. In either arrangement, the bottom surface of the tablet is oriented towards the perforated member and spray nozzle such that as the surface of the tablet is dissolved by the aqueous spray, the tablet should advance towards the spray nozzle to maintain a fixed distance between the spray nozzle and the contact surface of the tablet. If the distance between the tablet and the spray nozzle varies, the amount of bleach released from the tablet can be inconsistent.

A problem with some prior art tablets is that upon contact with the aqueous spray, the water can be absorbed by the tablet and cause the tablet to swell. Swelling of the tablet within the tablet reservoir can cause friction between the tablet and the tablet reservoir wall which prevents the tablet from advancing towards the spray nozzle. The unique coated bleach tablets of the present invention have a reduced likelihood of swelling, thus providing continuous advancement to maintain a predetermined distance between the tablet and spray nozzle. As used herein, the term "continuous advancement" connotes the movement of the coated tablets through the tablet reservoir of a dispenser apparatus with a reduced incidence of "hanging up" due to swelling of the tablet.

DETAILED DISCUSSION OF THE FIGURE

FIG. 1 is a cross-section of the portion of a dispenser apparatus used for introducing the active halogen bleach concentrate made using coated bleach tablets of the invention. In FIG. 1, the dispenser apparatus housing 1, a portion of an overall housing for a dispenser apparatus that can be adapted for dispensing 1, 2 or more solid shaped materials can be configured for dispensing the coated bleach tablets of the invention. An example of the dispenser shown in FIG. 1 is the Solid System III™ dispenser. Such a dispenser apparatus is used in laundry dispensing. In FIG. 1, a spray nozzle 2 is shown with a cone-shaped spray 3 directed from the nozzle 2 onto the bottom surface 4 of the shaped solid 5 contained within a tablet reservoir 6 which is then attached to the dispenser with a threaded connector 7 and shoulders 8 that cooperate with the housing of the nozzle 9. In the operation of the dispenser, fresh water is introduced into the dispenser through conduit 10, the water is sprayed through the nozzle 2 onto the bottom surface of the coated solid bleach tablet 5 creating a concentrate. The concentrate then passes down through the opening of the capsule 11 through the perforated member 12 to the outlet 13. Any large portions of the shaped solid that is released can be trapped by the screen 12.

An alternative embodiment of dispenser apparatus suitable for the present invention is disclosed in copending patent application, U.S. Ser. No. 08/644,620, the disclosure of which is incorporated herein by reference.

EXAMPLE

Example 1

Solid bleach tablets as disclosed in U.S. Pat. No. 5,407,598 were coated with a 5% aqueous solution of carboxy methyl cellulose (CMC) 7LT. (Hercules Aqualon, Wilmington, Del. 19899) The 5% CMC was coated on the sides of the tablets using a paint brush. The coating soaked into the pores of the tablets and dried to a smooth finish. The tablets were placed into a Solid System II™ dispensing system available from Ecolab, Inc., St. Paul, Minn. The tablets moved freely through the tablet reservoir of the dispenser.

Example 2

One solid bleach tablet as disclosed in U.S. Pat. No. 5,407,598 was coated on all surfaces with CMC as described in Example 1. The coated bleach tablet was put into a stability oven at 120° F. for two weeks. A sample of the product surface was titrated for chlorine loss. There was no loss in the percentage of available chlorine.

Example 3

9 solid bleach tablets as disclosed in U.S. Pat. No. 5,407,598 were coated with a 5% aqueous solution of the inorganic clay Laponite RDS. The solution was painted on the tablet, forming a gel which dried to a smooth finish.

Example 4

A solid bleach tablet comprising sodium perborate monohydrate was coated with a 5% aqueous solution of carboxy methylcellulose (CMC) 7LT. The 5% CMC was coated on the sides of the tablets using a paint brush. The coating soaked into the pores of the tablets and dried to a smooth finish. The tablets were placed into a SS II dispensing system. The tablets moved freely through the tablet reservoir of the dispenser.

Example 5

A 5% aqueous solution CMC was sprayed on the surface of 6 solid bleach tablets as disclosed in U.S. Pat. No. 5,407,598.

The coating was sprayed using a liquid pressure of 20 psi; atomization pressure of 10 psi and fan pressure of 20 psi. One surface (top/bottom) and sides were sprayed. After drying for 5 minutes the tablets were flipped over and the opposite surface and sides were sprayed. This provided two coats on the sides and one coat on each surface.

The above specification, examples and data provide a complete description of the preparation and use of the coated bleach tablets of the invention. Since many embodiments of the invention can be made without departing from the spirit and scope of the invention, the invention resides in the claims hereinafter appended.

I claim:

1. A method of dispensing an aqueous bleach solution created by dissolving a continuously advancing substantially coated bleach tablet in a stack of such coated tablets, said method comprising:

(a) using a first coated bleach tablet comprising a plurality of an encapsulated halogen bleach source which has been subsequently substantially coated with a water soluble coating, in a tablet reservoir;

(b) using a second coated bleach tablet comprising a plurality of an encapsulated halogen bleach source which has been subsequently substantially coated with a water soluble coating, wherein the second tablet sits atop the first tablet in a tablet reservoir; and (c) partially dissolving the first coated bleach tablet with an impinging spray, wherein the tablets move continuously downward in an uninterrupted fashion without swelling as the tablet is dissolved; and as the first spray tablet is consumed the second tablet takes the place of the dissolved first tablet; thereby maintaining a constant, predetermined distance between the spray nozzle and tablet.

2. The method according to claim 1 wherein said water soluble coating is an inorganic water soluble coating.

3. The method according to claim 2 wherein said inorganic water soluble coating is an inorganic synthetic clay.

4. The method according to claim 1 wherein said water soluble coating comprises a plurality of coating layers.

5. The method according to claim 4 including an organic and an inorganic water soluble coating layer.

6. The method according to claim 1 wherein said water soluble coating is an organic water soluble coating.

7. The method according to claim 6 wherein said organic water soluble coating is a cellulose ether compound.

8. The method according to claim 7 wherein said cellulose ether compound is carboxy methyl cellulose.

* * * * *